United States Patent [19]

Short

[11] Patent Number: 4,960,558

[45] Date of Patent: Oct. 2, 1990

[54] PROCESS FOR THERMOFORMING MULTIHUED LAMINATE FILMS

[75] Inventor: William T. Short, Southfield, Mich.

[73] Assignee: General Motors Corporation, Detroit, Mich.

[21] Appl. No.: 233,312

[22] Filed: Aug. 17, 1988

[51] Int. Cl.$^5$ .............................................. B29C 51/02
[52] U.S. Cl. ..................................... 264/510; 264/544; 264/132; 427/262
[58] Field of Search .................. 156/285; 264/510, 511, 264/512, 544, 553, 132, 129, 134, 135; 427/262, 263, 162

[56] References Cited

U.S. PATENT DOCUMENTS

| | | | |
|---|---|---|---|
| 3,660,200 | 5/1972 | Anderson et al. | 156/306 |
| 4,028,163 | 6/1977 | Frey | 156/229 |
| 4,172,169 | 10/1979 | Mawson et al. | 427/262 |
| 4,172,745 | 10/1979 | Van Manen . | |
| 4,233,343 | 11/1980 | Barker et al. | 427/264 |
| 4,235,949 | 11/1980 | Van Manen et al. . | |
| 4,268,570 | 5/1981 | Imanaka et al. . | |
| 4,330,352 | 5/1982 | Grimes et al. . | |
| 4,362,775 | 12/1982 | Yabe et al. . | |
| 4,439,479 | 3/1984 | Kanai et al. . | |
| 4,493,872 | 1/1985 | Funderburk et al. . | |
| 4,533,704 | 8/1985 | Alexander et al. . | |
| 4,563,372 | 1/1986 | Kurauchi et al. . | |
| 4,569,887 | 2/1986 | Cowles . | |
| 4,824,506 | 4/1989 | Hoerner et al. | 156/285 |
| 4,828,637 | 5/1989 | Mentzer et al. | 156/285 |

Primary Examiner—Jill L. Heitbrink
Attorney, Agent, or Firm—Randy W. Tung

[57] ABSTRACT

Thermoformable laminate films with a decorative feature include a polymer carrier film, a paint layer and a protective clearcoat and the clearcoat and paint layer have a preconfiguration which causes desired decorative features following deformation of the laminate by a thermoforming process. The laminated film has a paint coat of a desired hue and the protective clearcoat has a variable thickness selected to produce a two tone appearance in a finished molded product. The process of manufacture includes the steps of painting a polymeric support or carrier film and laminating the painted carrier film by process steps which will control the finished appearance of the laminate when applied to an underlying relatively rigid substrate or body part.

13 Claims, 3 Drawing Sheets

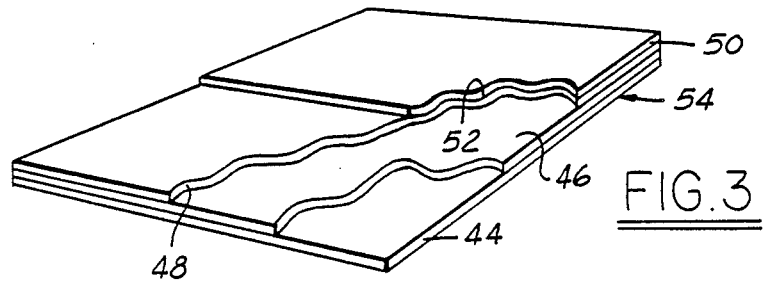
FIG.3
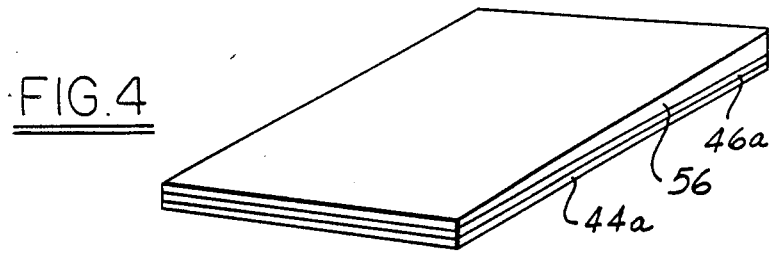
FIG.4
FIG.5
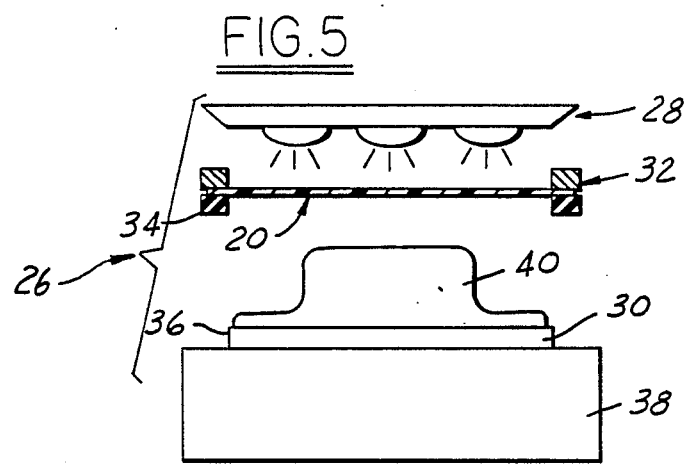
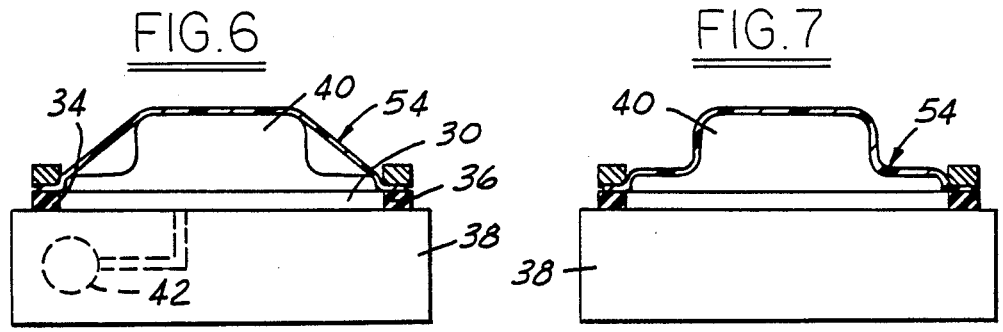
FIG.6   FIG.7

PROCESS FOR THERMOFORMING MULTIHUED LAMINATE FILMS

FIELD OF THE INVENTION

This invention relates to laminated coverings adapted to be thermoformed into bonded relationship with a relatively rigid substrate and more particularly to such laminates having a painted layer and to processes for pretreating such laminated coverings to produce desired appearance characteristics following molding of the laminated covering.

BACKGROUND OF THE INVENTION

It is known to process unfinished vehicle body parts to produce finished ready to use parts by thermoforming a decorative laminate to mold the laminate onto the unfinished surface of the body part.

Other prior art includes the following patents in which:

U.S. Pat. No. 4,028,163 discloses a process for stretching the length of a foil of synthetic plastic to assure that the foil material remains wrinkle-free as it is applied to an underlying door panel. In particular, the specified tensioning method assures that the foil remains under tension until it is wrapped around the edge of a door panel.

U.S. Pat. No. 4,268,570 discloses a metal coated plastic product with a polymeric carrier film. The metal coating is vacuum deposited and covered with a protective top coat to protect the vacuum deposited metal.

U.S. Pat. No. 4,533,704 discloses a basecoat/clearcoat system which can be applied to either a metal or plastic substrate to protect the substrate. The clearcoat top layer is a urethane modified polyester. The basecoat is a urethane modified polyester including a pigment.

U.S. Pat. No. 4,569,887 discloses a vehicle body coating composition which includes a uniformly dispersed pigment oriented by use of a chlorinated polyolefin.

U.S. Pat. No. 4,172,745 discloses a method to tension a laminate of polyester material bearing a layer of metallic material both bonded to a substrate of PVC material. The tensioning occurs below the annealing temperature of the laminate and serves to strain the laminate to cause it to shorten upon reheating but to remain stable during shipping and storage.

Other patents relating to polymer laminates with decorative features including metallic coatings are shown in U.S. Pat. Nos. 3,660,200; 4,235,949; 4,330,352; 4,362,775; and 4,563,372.

None of the above references discloses a process for preforming the laminated structure in a manner which will produce gloss or color hue contrast in the molded product.

SUMMARY OF THE INVENTION

Known processes for preventing loss of gloss and changes in color during thermoforming of a laminated film of the type having a colored basecoat or painted film layer have included steps to prevent loss of gloss or changes in color when the laminated material is molded on a substrate.

One approach has been to provide a polymeric carrier film; a paint layer and a clear protective top coat. The prevention of loss of gloss in prior laminates has been accomplished by forming a controlled clearcoat thickness (on the order of 1-5 mil thickness) as part of the initial laminate structure or by application of such a clearcoat following thermoforming of the carrier film to the substrate.

One problem has been to assure that such a process will produce reproducible decorative color effects under mass production conditions.

Another problem in molding thermoforming color laminates including a clearcoat protective layer is that use of different colors in the color coat of the laminate can cause unequal heat absorption as the laminated is heated during the thermoforming process. Such differential heat absorption can adversely affect the surface gloss of the clearcoat protective layer and can change the appearance of the color hue in the finished product.

An object of our invention, therefore, is to provide a deformable laminate in which a multihued appearance is controlled in the molded polymeric film by providing a monotone pigmented color layer or pigmented base or carrier film layer and by providing one or more layers of a clear or transparent coating of varying thickness and wherein the deformable laminates resultant appearance is controlled by differences in the thickness of the clearcoat.

A further object of our invention is to provide a deformable laminate of the type set forth in the preceding object wherein the color coat of the laminate includes flakes of pigment and wherein a two tone chroma is obtained by varying the thickness of the protective clearcoat.

A further feature is to provide a method to form finished vehicle body parts from a part with an unfinished surface by the steps of painting a polymeric support or carrier film and laminating the painted carrier film by process steps which will produce a controlled color hue in the surface appearance of the laminate when molded and bonded to the unfinished surface of the body part.

Still another feature of the present invention is to provide a method of the type set forth in the preceding object wherein the color coat layer has a single hue and is selectively coated with first and second layers of a clearcoat of a thickness which will retain surface gloss on one portion of the visible surface of the finished part and which will controllably reduce the gloss and darken color hue on another portion of the visible surface so as to define a resultant two tone color tone based on the hue of the color coat.

Yet another feature of our invention is to provide a thermoformable laminate having a color pattern on one layer of the laminate which has its gloss selectively controlled by initially varying the thickness of a clearcoat prior to molding to produce a resultant molded surface appearance of desired hue differences based upon the color hue of the color coat of the laminate.

Other objects are to control such surface appearance hue differences by providing a clearcoat layer which has two distinct thicknesses.

Another object is to control such surface hue differences by use of a clearcoat layer which is of a wedge shape.

Other objects, features and advantages of the present invention will be readily appreciated as they become better understood with reference to the following description when considered in conjunction with the accompanying drawings wherein:

BRIEF DESCRIPTION OF THE DRAWINGS

FIG. 3 is a perspective view, partially broken away, of a first embodiment of the laminate of the present invention;

FIG. 4 is a perspective view, partially broken away, of a second embodiment of the laminate of the present invention;

FIG. 5-7 are diagrammatic views of thermoforming apparatus for molding the laminates of the present invention.

DETAILED DESCRIPTION OF THE PREFERRED EMBODIMENTS

Figure 1:
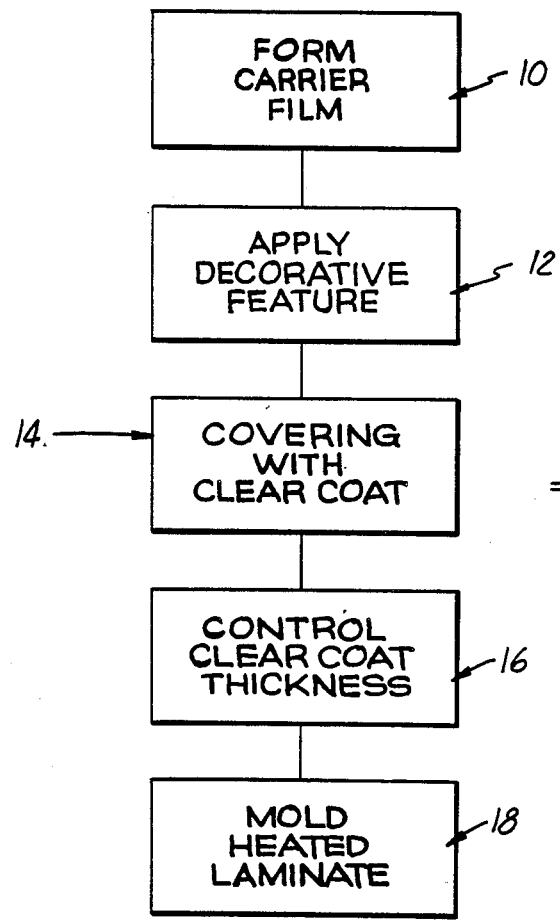
FIG. 1 is a chart showing the process of the present invention.

Referring now to FIG. 1, the process of the present invention includes the steps of forming 10 a thermoformable carrier film from a family of thin polymers including any suitable polymer which is deformable by application of heat thereto.

The process includes painting 12 the carrier film with a color coating in the laminate and covering 14 it with a protective clearcoat layer.

Our inventive process includes premolded control 16 of the thickness of the clearcoat to control the surface appearance of the molded laminate following exposure of the laminate to the heater array of a thermoforming apparatus. The process includes molding 18 the heated laminate against a relatively rigid substrate such as the unfinished exposed surface of a vehicle body part to produce an enhanced decorative effect on the finished body part.

In brief, the process includes forming a polymeric carrier film, painting it and clearcoating it by a method which will enable the laminate to be thermoformed to produce a decorative surface appearance with a two tone hue (or variable hue).

In one aspect, our process can use a monotone paint coat with a high heat absorption for the radiant heat energy used. In such case, the heater array of the thermoforming apparatus does not have to be adjusted to compensate for differences in heat absorption attributable to a paint coat of varying color (light and dark) with greater or less heat absorption from the heater array.

The process produces a multihued or two toned finish appearance on automobile body panels or the like without requiring multiple finishing steps or surface treatments after a decorative laminate is molded to the substrate. A variety of chroma effects are established in a controlled manner directly as a result of precontrolling the thickness of a clearcoat in a thermoformable polymeric film laminate.

PRIOR ART

Figure 2:
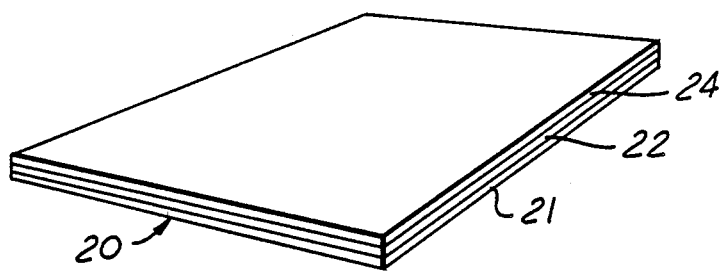
FIG. 2 is a typical laminate used in decorative thermoformable laminates.

A prior art laminate 20, shown in FIG. 2, has a polymeric carrier film 21; a paint layer 22 and a clear protective top coat 24. The prevention of loss of gloss in prior laminates has been accomplished by use of a thick clearcoat in the order of at least 1 to 3 (with a possible range of 1–5) mil thickness as part of the initial laminate structure or by application of such a clearcoat following thermoforming of the carrier film to the substrate. The exact thickness of clearcoat required depends upon the composition of the basecoat, and the amount of strain to which it is exposed during thermoforming. In order to obtain color or gloss variation in such laminates the paint layer can include two shades of color or chroma. Such differences, however, can create a heat absorption problem during the thermoforming process which can lead to an uncontrolled (and often undesired) dulling of the clearcoat 24.

Typical thermoforming apparatus 26 for heating the laminated material is shown in FIGS. 5-7. It includes radiant heaters 28 arranged in a suitable array for raising the temperature of a laminate to a point that it can be molded against a substrate. The illustrative apparatus 26 has a vacuum buck 30 and a support frame 32 for the laminate. A gasket 34 is provided on the frame 32 for sealing the periphery 36 of the buck 30 on a vacuum form table 38. While a vacuum forming system is illustrated, it should be understood that any differential forming system is suitable to mold such laminates.

In such apparatus the laminate 20 is clamped in the frame 32. The radiant heaters 28 are energized to soften the polymeric material. Once the carrier film (and other layers of the laminate) are sufficiently softened, the frame 32 is lowered from the heaters 28 to be positioned to cause the laminate 20 to be draped over the substrate part 40.

Gasket 34 is positioned to seal against the buck 30 and a vacuum source 42 is operated to produce a pressure differential across the laminate 20 to firmly mold it in place on the substrate part 40.

The laminate 20 can optionally be backed by an adhesive layer or an adhesion promoter for enhancing the bond between the molded laminate and the substrate.

The following examples demonstrate some embodiments of our invention.

EXAMPLE 1

A carrier film 44 of the type shown in FIG. 3 is selected from a suitable class of thermoformable carrier film material such as thermoplastic polyurethanes, polyesters, vinyl copolymers, polyvinylchloride and blends, copolymers or alloys thereof. It should be understood that the listed materials are merely cited as examples of suitable moldable polymeric carrier films on which a decorative feature can be applied.

In this embodiment the process includes the step of coating the thermoformable carrier film with an elastomeric light blue aluminum flake paint or color coat 46 of a uniform color hue. The color coat 46 is characterized by having a matte or satin finish (less than 10 on the 20 degree gloss meters 01-100 scale) when deformed without a clearcoat protective layer.

In accordance with the process of the present invention, the paint coat of uniform hue has a controlled prethickness of clearcoat applied thereon. It includes a first layer 48 of clearcoat (1 mil). The clearcoat layer 48 defines a surface appearance of soft or satin finish in the molded product.

The first layer 48 of clearcoat is then coated with a further layer 50 of clearcoat material through only a portion 52 of the surface extent of the laminate as shown in FIG. 3. The resultant laminate 54 is characterized by a clearcoat of varying thickness within dimensional ranges that produce a desired, controlled variation in the surface gloss on the covered substrate.

The order of the clearcoat deposit can be varied so long as a controlled clearcoat thickness differential results. Two effects are observed. First, the single monotone hue of the paint coat results in uniform heat absorption so that the gloss of the finished part is not heat dependent but is attributable to the controlled thickness of the clearcoat layer(s) 48, 50. After molding, the thick coat layer 50 remains glossy and bright while the thinner coat layer 48 defines a contrasting appearance of dramatically lower gloss which, as will be discussed, is established by controlling the thickness of the thinner layer 48 rather than being temperature dependent or by requiring finishing of the laminate following the molding step.

Thus, the difference in gloss is not caused by different heat absorption rates but rather is due to a selection of appropriate control thickness of the clearcoat layers 48, 50.

A second observed effect is that the thinner coating layer 48 will cause a change in the hue of the monotone hue of the paint coating 46 to cause part of the coating 46 to appear dark (under the thinner clearcoat layer 48) and to cause part of the coating 24 to appear lighter. The process has the advantage of producing a finished two tone surface appearance without finishing the finally molded product. Further it eliminates the application of two different color coats with attendant masking requirements along a breakline between the different colors. The paint layer of the present invention only requires one set of applicators and one set of blending and mixing systems.

In this example, durability of the finished part is improved because there is a clearcoat covering on all portions of the finished part (as well as on the basecoat or carrier film). Consequently UV rays are screened by clearcoat stabilizers including hindered amines (HAL) benztriazol UV absorbers or other UV stabilizers customarily used in automotive clearcoats. It should be understood that the clearcoat can be selected from a wide range of transparent or tinted clear polymers such as melamine-polyols, polyesters, polyurethanes, acrylics, polyethers, polyolefins and copolymers thereof, so long as the clearcoat is compatible with the material of the paint or color coat and is deformable during the molding of the laminate to the substrate.

EXAMPLE 2

In this example the clearcoat layers 48, 50 are replaced by a wedge shaped clearcoat layer 56. The color coat and carrier film can remain the same and are designated by like reference numerals with the designator "a". The wedge shaped clearcoat layer 56, because of its continuously varying thickness, produces a surface appearance with a gradually changing field of gloss across the molded part. A variance in color hue follows the thickness of the clearcoat as well. Such styling effects are not possible by known mass production methods of spray painting unfinished vehicle body parts and the like. While a wedge of constant slope is illustrated it should be understood that the term wedge equally applies to thickness changes of a constantly varying slope and to multi-stepped surface changes produced by a number of incremental thickness differences in the clearcoat layer.

EXAMPLE 3

Even more dramatic color hue effects are produced if the techniques of the aforedescribed examples are enhanced by adding a transparent pigment to the clearcoat so as to further accent both gloss and hue changes due to thickness control of the clearcoat. Examples of such enhancement material includes soluble iron oxides, organic dyes and the like. The enhancements are mixed with the clearcoat compositions mentioned above. The transparent pigments in the clearcoat layer serve to diffuse the incoming light to produce highlighting of the paint coat colors while gloss differences are varied within the control ranges noted in the following FIG. 8 graph.

Effects of Clearcoat Thickness on Surface Gloss

Figure 8:
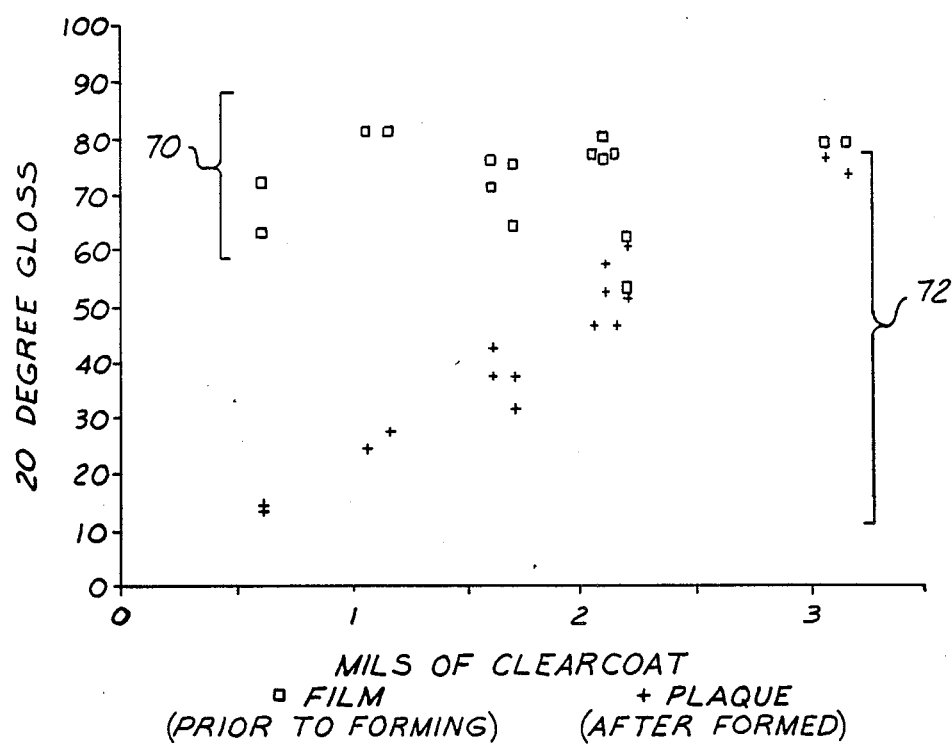
FIG. 8 is a graph showing the effect of controlling surface gloss by use of the present invention, in this case for a 1 mil (25 u) blue metallic basecoat with varying thicknesses of a clearcoat.

As shown in FIG. 8, an uncoated carrier film layer, in the form of a 7 mil thick polyester film, is coated with 1 mil of a blue metallic basecoat. The coated film has essentially the same background brightness (in the range of 60 to 80 on the 20 degree gloss scale) as shown by reference numeral 70 as measured by a 20 degree gloss meter manufactured by Hunter Associates Laboratory Inc. of Reston, Va. The effect of clearcoat thickness on gloss is shown by the plaque (thickness) data points (reference numeral 72). As can be seen, the use of less than one mil clearcoat thicknesses produce a dramatic drop off in surface gloss readings. There is a commensurate darkening of the hue of the color of the metallic basecoat. The addition of ever increasing thicknesses of the clearcoat has the surprising effect of not only increasing the gloss of the part, but also of increasing the lightness of the hue of the basecoat color. In other words in the thinner range of clearcoats the basecoat color will be a darker blue and the basecoat color will lighten in hue as the thickness of the clearcoat increases until the color hue of the basecoat approaches the color of the uncoated basecoat in the range of 3 mils thickness of clearcoat material. The exact range of clearcoat thickness required can depend on details of the specific basecoat formulation (pigment type, shape and concentration) and the amount of strain developed during forming, but the general trend remains, e.g., thinner clearcoats permit the greatest gloss and color change, while thicker ones show little or no effect when stretched.

Industrial Applicability

An advantage of the process of our invention is that multiple hued color parts can be manufactured from a single base color. This reduces the need to mix multiple batches of different colored paint stocks. The use of preformed laminates eliminates the need to apply a wide range of different colored paints to an unfinished substrate such as the unfinished, exposed surface of a vehicle body panel or part. Our process will reduce emissions and will require less energy. Furthermore, it simplifies paint apparatus set-up time between runs of different colored parts. Furthermore, it eliminates the need for special masking and application steps in complex mass production paint systems.

The use of preformed laminates which can be molded to a substrate to form multihued finishes also will require less part handling and such reduced handling leads to improvements in throughput capacity of finishing plants.

While our invention has been described in an illustrative manner, it is to be understood that the terminology which has been used is intended to be in the nature of words of description rather than of limitation.

What is claimed is:

1. A process for making a thermoformed part of painted carrier films molded to substrates for providing a one step finishing process comprising the steps of:
   providing a polymeric carrier film;
   coating the carrier film with a color coat having a predetermined gloss and color hue;
   depositing a variable thickness a clearcoat of a uniform material to the color coat to cover a full surface area of the color coat; and
   molding the coated carrier film to form a surface of a relatively rigid substrate to produce a finished product with the variable thickness clearcoat conforming substantially to the thickness of the initially deposited clearcoat so as to produce a variable surface appearance in an exposed surface of the thermoformed part which varies in accordance with the variances in the starting thickness of the clearcoat and which follows an initial chroma of the color coat.

2. In the process of claim 1 wherein the color coat includes metallic fragments.

3. In the process of claim 1, wherein the uniform clearcoat material includes transparent pigment fragments to enhance the chroma and gloss of the exposed surface of the thermoformed part.

4. In the process of claim 1 depositing the variable thickness clearcoat by forming a first clearcoat layer across the full surface area of the color coat and a second clearcoat layer on the first clearcoat layer across only a portion of the full surface area of the color coat and wherein the first and second clearcoat layers are the same uniform material.

5. In the process of claim 4, depositing the variable thickness clearcoat by applying the first clearcoat layer in a thickness range of less than 1 mil to produce a gloss reduction in the color coat of more than 50%.

6. In the process of claim 1, depositing the variable thickness clearcoat by covering a part of the full surface area of the color coat with a first thickness of clearcoat to maintain the surface gloss of the color coat after said molding step and covering another part of the full surface area of the color coat with a thinner layer of clearcoat such that said surface gloss of the color coat in said another part is reduced after said molding step.

7. A process for surface finishing a vehicle body part having an unfinished exposed surface appearance without passing the vehicle body part through a paint line comprising the steps of:
   providing a body part with an exposed surface having an unfinished surface appearance;
   forming a laminated cover for the body part, said laminated cover having a sheet form with a decorative paint layer and a clearcoat layer, said clearcoat layer having variable thickness and being made of a uniform material;
   molding the laminated cover to the body part to decorate the exposed surface and to form a finished surface on the body part; wherein said variable thickness clearcoat layer after molding causing a variable gloss and surface appearance of the finished surface.

8. In the process of claim 7, forming the clearcoat to have first and second regions that differ in thickness;
   selecting one of the clearcoat thicknesses to produce a reduction in an uncoated gloss of the decorative paint layer of greater than 50%.

9. In the process of claim 7, forming the paint layer as a single monotone color; and varying the color hue of the finished surface by presetting the thickness of the clearcoat to a variable depth on the laminate cover prior to molding the laminate to the body part.

10. In the process of claim 9, varying the color hue of the finished surface by presetting the clearcoat to have a continuously varying thickness as initially applied to the carrier film prior to molding the laminate to the vehicle part.

11. In the process of claim 9, varying the color hue of the finished surface by applying a first clearcoat layer across a full planar extent of the paint layer and thereafter applying a second clearcoat layer across only a portion of the planar extent of the first clearcoat layer and wherein the first and second clearcoat layers are the same uniform material.

12. In the process of claim 7, mixing transparent pigment material with the clearcoat to enhance the variation in gloss and surface appearance produced from the changes in the thickness of the clearcoat.

13. In the process of claim 9, mixing transparent pigment material with the clearcoat to enhance the variation in gloss and color hue produced from the changes in the thickness of the clearcoat.

* * * * *